United States Patent
Queveau et al.

(10) Patent No.: US 7,341,278 B2
(45) Date of Patent: Mar. 11, 2008

(54) SAFETY DEVICE USED IN CASE A VEHICLE ROLLS OVER

(75) Inventors: Gérard Queveau, Le Pin (FR); Paul Queveau, Montravers (FR); Jean-Marc Guillez, Cirieres (FR)

(73) Assignee: Heuliez (FR)

( * ) Notice: Subject to any disclaimer, the term of this patent is extended or adjusted under 35 U.S.C. 154(b) by 319 days.

(21) Appl. No.: 11/037,383

(22) Filed: Jan. 18, 2005

(65) Prior Publication Data

US 2005/0280253 A1    Dec. 22, 2005

(30) Foreign Application Priority Data

| Jun. 21, 2004 | (FR) | ................................. 04 51302 |
| Jun. 21, 2004 | (FR) | ................................. 04 51303 |
| Jul. 2, 2004 | (FR) | ................................. 04 51412 |

(51) Int. Cl.
  *B60R 21/13* (2006.01)
(52) U.S. Cl. .................................... 280/756
(58) Field of Classification Search ................ 280/756
  See application file for complete search history.

(56) References Cited

U.S. PATENT DOCUMENTS

| 5,224,735 | A |   | 7/1993 | Jambor et al. ............... 280/756 |
| 5,626,361 | A | * | 5/1997 | Heiner ......................... 280/756 |
| 5,890,738 | A | * | 4/1999 | Heiner et al. ................ 280/756 |
| 6,352,285 | B1 |   | 3/2002 | Schulte et al. .............. 280/756 |
| 6,443,517 | B1 | * | 9/2002 | Just et al. ............... 296/107.09 |
| 6,902,190 | B2 | * | 6/2005 | Nass ........................... 280/756 |
| 2005/0140129 | A1 | * | 6/2005 | Miki et al. .................. 280/756 |
| 2005/0212277 | A1 | * | 9/2005 | Hamamoto et al. ......... 280/756 |
| 2006/0001248 | A1 | * | 1/2006 | Queveau et al. ............ 280/756 |

FOREIGN PATENT DOCUMENTS

| DE | 201 03 001 | 6/2001 |
| EP | 0 411 448 | 2/1991 |
| EP | 0 411 449 | 2/1991 |
| EP | 1 028 050 | 8/2000 |
| EP | 1 186 481 | 3/2002 |
| WO | WO/91/02669 | 3/1991 |

* cited by examiner

*Primary Examiner*—Paul N. Dickson
*Assistant Examiner*—Drew J. Brown
(74) *Attorney, Agent, or Firm*—Nawrocki, Rooney & Sivertson, P.A.

(57) ABSTRACT

Safety apparatus to reduce injury to occupants of a convertible in the event of its rollover. The apparatus utilizes opposed curved bars slideably stored within mating, hollow, arcuate receptacles attached to the vehicle with one end open upward across and adjacent to the top rear of an occupant's seat. The bars each have springs arranged to deploy one end of the bar upward and outward from the top of a receptacle. A trigger mechanism secures the bars within the receptacles against the force of the spring. The trigger is arranged to release both springs in the event of impact, thus permitting the bars to be deployed outward opposite the top of the vehicle. When deployed in this manner, locks secure the bars in the deployed position.

24 Claims, 6 Drawing Sheets

SAFETY DEVICE USED IN CASE A VEHICLE ROLLS OVER

BACKGROUND OF THE INVENTION

The present invention relates to a safety device used in case a vehicle rolls over, and in particular to such a safety device that comprises:

- at least two curved bars, each curved bar having a first end and a second end, said bars being movable from a retracted position to a deployed position in case of a rollover;
- a pre-stressed system for deploying each bar;
- a trigger system that is activated in case the vehicle rolls over; and
- at least one locking member that maintains the pre-stress and that is released by means of the trigger system, thereby releasing each bar from its retracted position;

Such devices are known, for example, from Documents U.S. Pat. No. 5,205,585 and WO-A-91/02669.

In those documents, the systems for pre-stressing, locking, and controlling the curved roll-bars are disposed behind the backs of the seats to be protected so that those systems encroach on the length of the luggage compartment over substantially the entire height of said compartment.

SUMMARY OF THE INVENTION

Motor vehicles are also known that are of the "convertible" type which are convertible into open-top vehicles, in which the roof, made up of a plurality of portions, can either be overlying the passenger compartment, when the roof is "up", or stowed away in the luggage compartment when the roof is "down" in the open-top configuration.

In such vehicles, it is essential to have a luggage compartment that is as long as possible in order to stow away the roof elements. Prior art safety devices are therefore unsatisfactory from that point of view because they give rise to a significant reduction in the stowage length inside the luggage compartment.

An object of the present invention is to mitigate those drawbacks.

To this end, the invention provides firstly a safety device used in case a vehicle rolls over, said safety device comprising:

- at least two curved bars, each curved bar having a first end and a second end, said bars being movable from a retracted position to a deployed position in the event of a rollover;
- a pre-stressed system for deploying each bar;
- a trigger system that is activated in case the vehicle rolls over; and
- at least one locking member that maintains the pre-stress and that is released by means of the trigger system, thereby releasing each bar from its retracted position;
- the first end of each bar being hinged to a common central plate so that each of said two bars extends on a respective side of said plate, from a common face of said plate, and substantially symmetrically about a plane, the pre-stressed system, the trigger system, and the locking member for each bar being provided on the same face of said plate, said hinging of each bar being achieved by means of a bearing comprising a stationary part secured to the plate, and a moving part secured to the first end of the bar, the plate being designed to be fixed to a structural element of the vehicle.

The stress, locking, and control members are thus grouped together very compactly on a common assembly plate. On the same one of its faces, the plate also supports the bearings for hinging the roll-bars. Therefore, instead of being disposed between the seat back and the luggage compartment, the locking, control, and pre-stress devices can be disposed in the top portion of said luggage compartment whose length is thus increased over most of its height.

In a particular embodiment, the moving portion of the bearing is provided with a shape element which co-operates with the locking member of the locking system such as:

- firstly to hold the bars in their retracted and pre-stressed position by means of the locking member engaging with the shape element; and
- secondly to release the curved bars by means of the locking member disengaging from the shape element.

Also in a particular embodiment, the moving portion of the bearing comprises a shaft secured to the first end of the curved bar, said shaft being hinged about a pivot axis to the stationary portion of the bearing.

More particularly, the shape element may be a cavity in or a protrusion of the shaft, and the locking member is mounted to move on the stationary portion of the bearing.

Also in a particular embodiment, the pre-stressed system is disposed inside the stationary portion of the bearing and in the immediate vicinity of the moving portion of the bearing.

More particularly, the pre-stressed system may be a spring disposed around the shaft, said spring having a first end connected to the moving portion of the bearing and a second end connected to the stationary portion of the bearing.

Even more particularly, the spring may be a torsion spring.

Also in a particular embodiment, the second end of each bar is adapted so that a anti-reverse lock system disposed between the second end of each bar and a structural portion of the vehicle prevents the bar from retracting when said bar is in the deployed position.

Such an arrangement may also be used independently of the preceding characteristics, for the purpose of reinforcing the rigidity of the roll-bars as explained below.

More particularly, the anti-reverse lock system may be a ratchet system.

Also in a particular embodiment, the control, locking, and releasing devices for controlling, locking, and releasing each bar are actuated by a common actuator.

Also in a particular embodiment, the axes of the bearings are substantially parallel.

The invention also provides a motor vehicle including at least one row of seats secured to the floor, said vehicle being equipped with a safety assembly used in case it rolls over, said assembly comprising:

- two curved bars, each of which has a first end and a second end, said bars being movable from a retracted position to a deployed position in case the vehicle rolls over, and the first ends of said bars being hinged to a support;
- a pre-stressed system for deploying the bars; and
- a locking system that keeps the bars pre-stressed and that is released by means of a trigger system;
- said motor vehicle including a vehicle structural element that is situated behind the seats, said structural element extending transversely and substantially horizontally, and being supported on either side at its ends on the chassis of said vehicle, said structural element having a bottom portion situated at a certain height above the floor of the vehicle, and a top portion to which said support is secured.

Thus, the hinges of the bars are mounted above the structural element on a support that can also receive the pre-stressing, locking, and control devices for pre-stressing, locking, and controlling the curved roll-bars. Since the structural element is supported on either side, the space situated at the front of the luggage compartment is left vacant over its entire height between the floor and the bottom portion of the structural element.

In a particular embodiment, the vehicle has a roof made up of a plurality of elements that are retractable into a stowage position situated behind the seats, and one or more of said roof elements are received in the portion under said structural element when it/they is/are in said stowage position.

Also in a particular embodiment, anti-reverse lock systems are disposed between the structural side portions of the vehicle and each of the second ends of the bars, so as to prevent the bars from retracting when they are in the deployed position.

Also in a particular embodiment, the support is disposed in a transverse plane of the vehicle, and the portions of the bars that extend from said second ends are, in their retracted position, situated some distance forwards from the transverse plane of the vehicle in which the support is disposed.

Also in a particular embodiment, the structural element to which the support is secured is a beam.

More particularly, said structural side portions of the vehicle may be hollow tank members adapted internally to receive said portions of the bars in the retracted position and the anti-reverse lock systems.

The beam may also have two ends connected to said hollow tank members which are disposed on either side of the chassis of the vehicle.

In a particular embodiment, each anti-reverse lock system includes a guide device for guiding the bars as they are being deployed.

Also in a particular embodiment, the first ends of the curved bars are hinged to the support in the vicinity of each other, and the pre-stressed system, the locking system, and the trigger system are incorporated into the support, thereby forming a support unit that enables the bars to be hinged, locked, pre-stressed, and deployed.

More particularly, the locking system and the trigger system may be common to the set of bars.

The invention also provides a safety assembly designed to equip a vehicle as described above, said safety assembly comprising:

two curved bars, each of which has a first end and a second end, said bars being movable from a retracted position to a deployed position in case the vehicle rolls over, and the first ends of said bars being hinged to a support;

a pre-stressed system for deploying the bars; and a locking system that keeps the bars pre-stressed and that is released by means of a trigger system;

each of the curved bar portions extending from the second ends being inserted into a guide for guiding the bars as they are being deployed, the guide carrying a anti-reverse lock system; and the support being connected via the curved bars to the guides, whose anti-reverse lock systems are locked, the resulting assembly thus forming a pre-assembled module.

In a particular embodiment, link elements connect the support unit to the guides.

The invention also provides a method for assembling a safety assembly as described above, said method consisting in:

installing the pre-stressed systems, the locking system, and the trigger system on said support in order to form the support unit;

installing the first ends of the bars in the hinges of the support unit and placing the bars in their deployed position;

connecting the second ends of the bars to the guides by locking the anti-reverse lock systems;

disposing the pre-assembled module above said structural element of the vehicle and positioning the guides above the structural side portions;

lowering the pre-assembled module by inserting the guides into the structural side portions;

fixing the support unit to the structural element, and fixing the guides to the structural side portions;

releasing the locking system;

pivoting the bars from the deployed position to the retracted position, the two ends being guided by the guides; and locking the locking system.

In a particular implementation, during pre-assembly of the safety module, the support unit and the guides are connected together via link elements.

A particular embodiment of the invention is described below by way of non-limiting example and with reference to the accompanying diagrammatic drawings, in which:

DETAILED DESCRIPTION OF THE INVENTION

Figure 1:
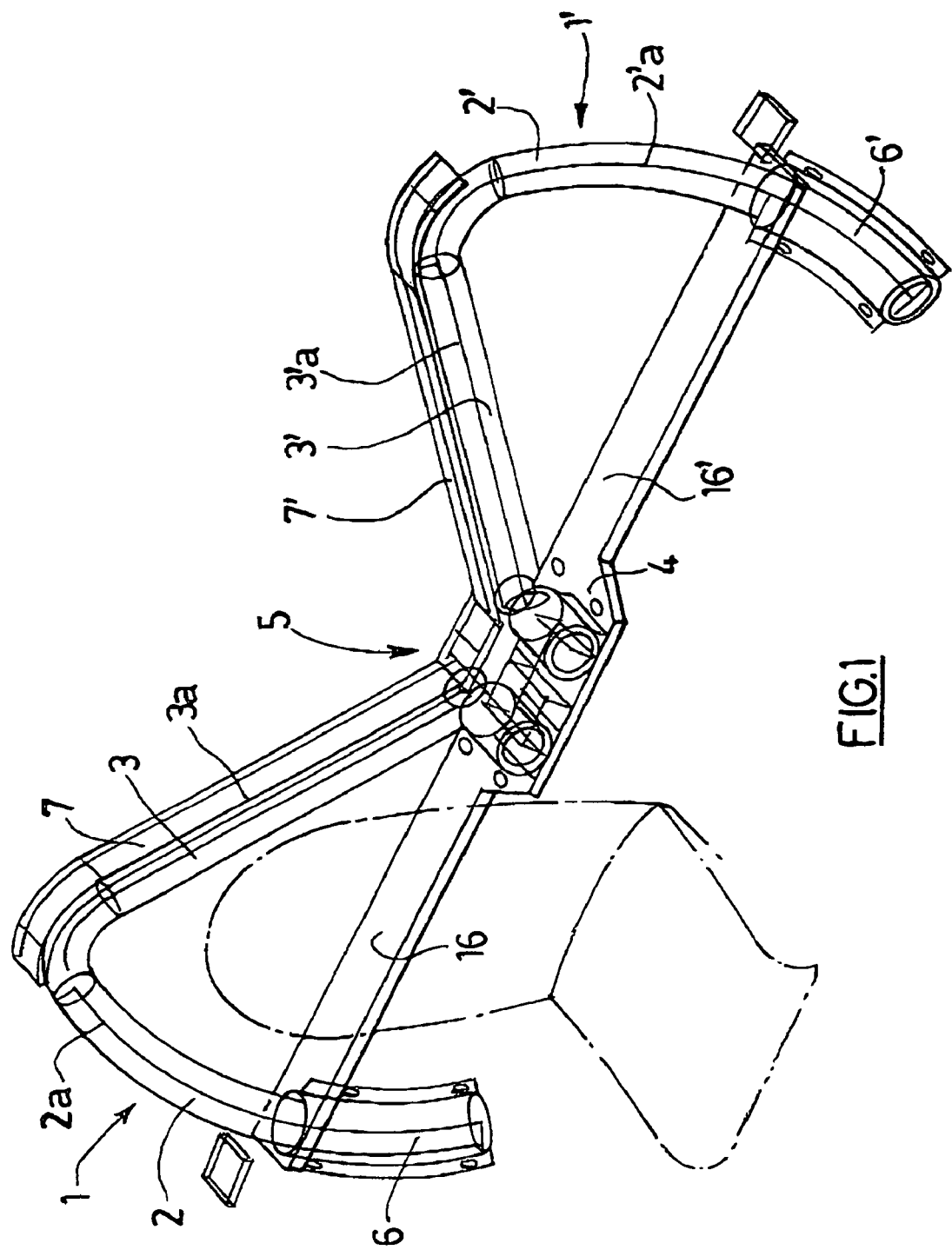
FIG. 1 is a perspective view of a set of roll-bars for motor vehicles.

FIG. 1 shows two roll-bars 1 and 1', each of which is constituted by a curved bar or tube forming two branches 2 & 3, 2' & 3'. The axes $2a$ and $2'a$ of the branches 2 and 2' of the roll-bars extend in substantially circularly arcuate manner while the axes $3a$ and $3'a$ of the branches 3 and 3' extend substantially rectilinearly.

The roll-bars 1 and 1' are hinged symmetrically along two opposite side edges of one face of a plate 4. Since the two roll-bars are symmetrical, only the roll-bar 1 and what is related to it is described below.

The branch 3 of the roll-bar 1 has its free end hinged at 5 to the plate 4 so as to pivot in its plane relative to said plate. The free end of the branch 2 is engaged in a guide tube 6 which can be of a shape complementary to the shape of the branch 2, so as to guide the roll-bar 1 as it pivots about the hinge 5.

The branch 3 of the roll-bar 1 receives a trim covering 7 making it possible to hide the roll-bar when it is in the retracted position.

Figure 2:
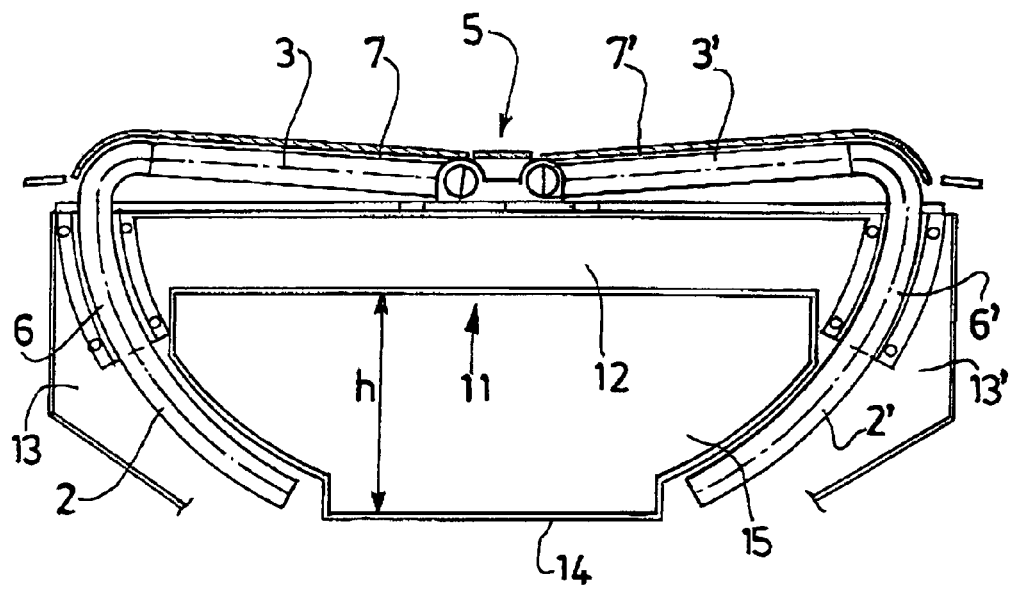
FIG. 2 is an elevation view in the retracted position.
Figure 3:
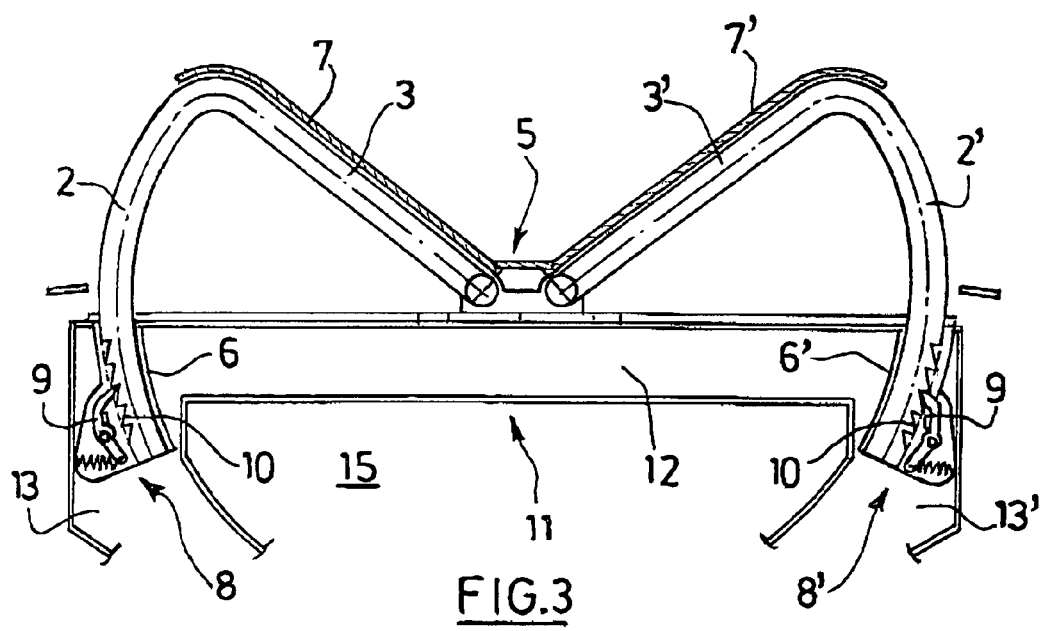
FIG. 3 is an elevation view in the deployed position.
Figure 4:
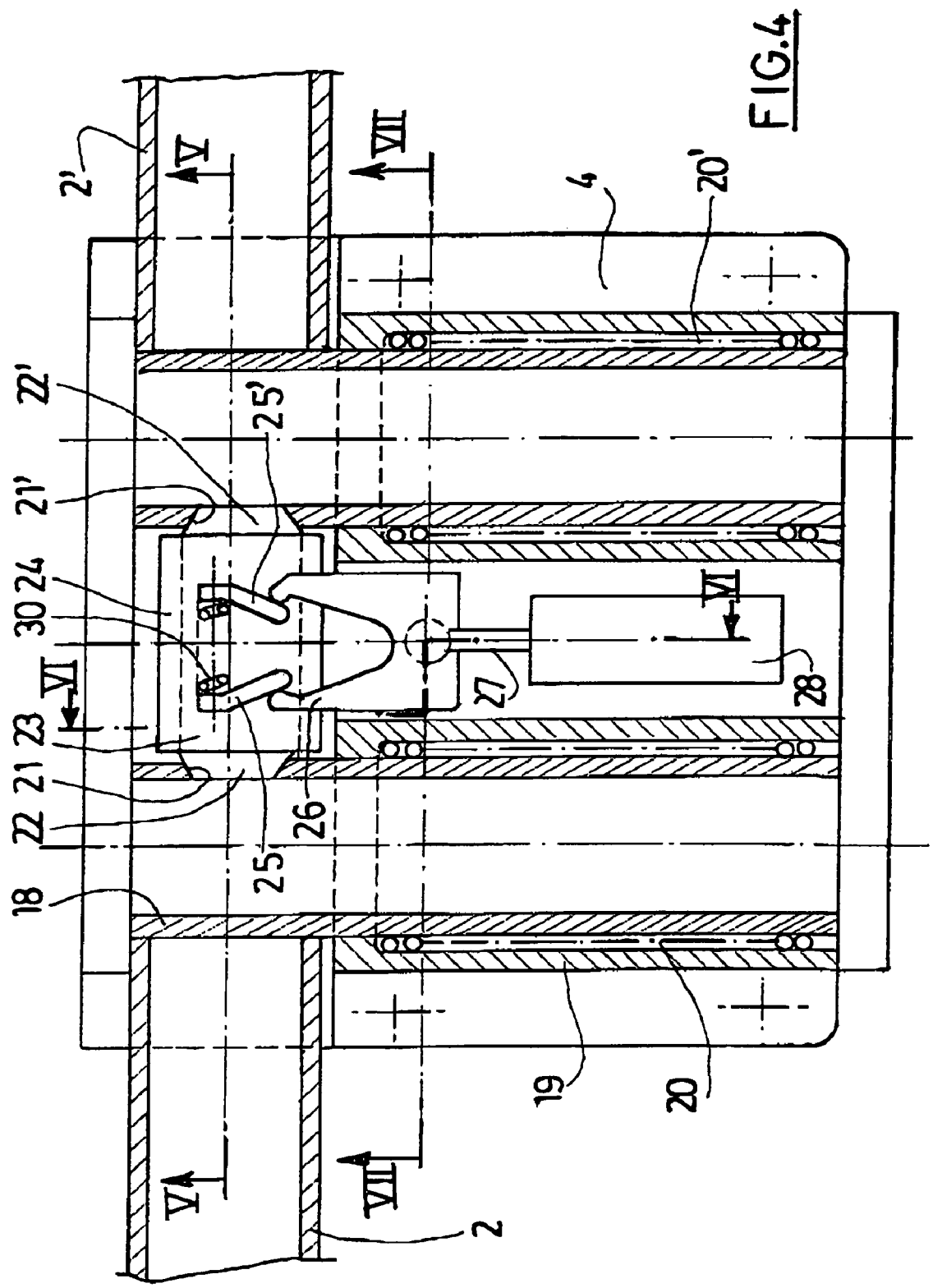
FIG. 4 is a section view from above taken along line IV-IV of FIG. 5, showing the control assembly for controlling the roll-bars.
Figure 5:
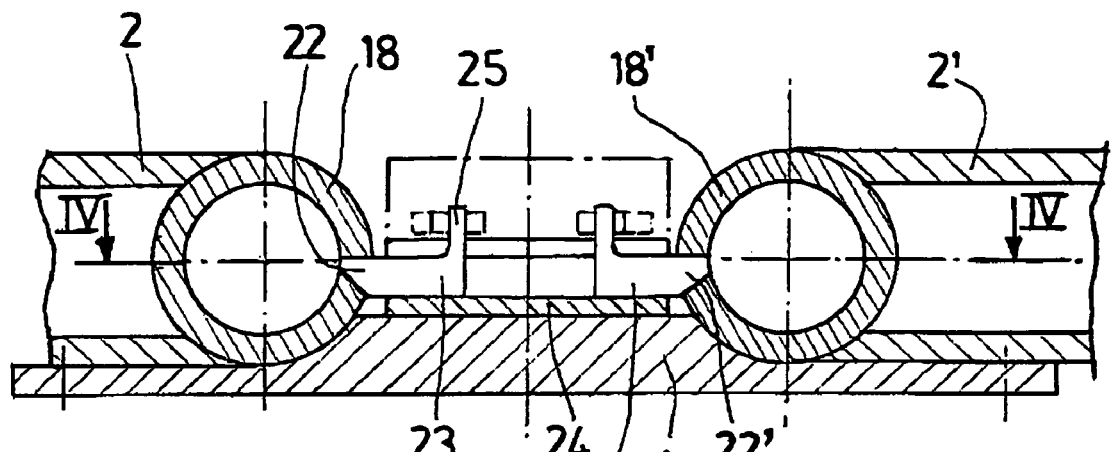
FIG. 5 is a section view taken along line V-V of FIG. 4.
Figure 6:
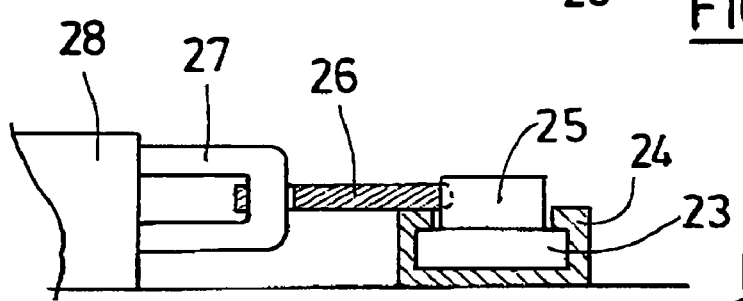
FIG. 6 is a section view taken along line VI-VI of FIG. 4.
Figure 7:
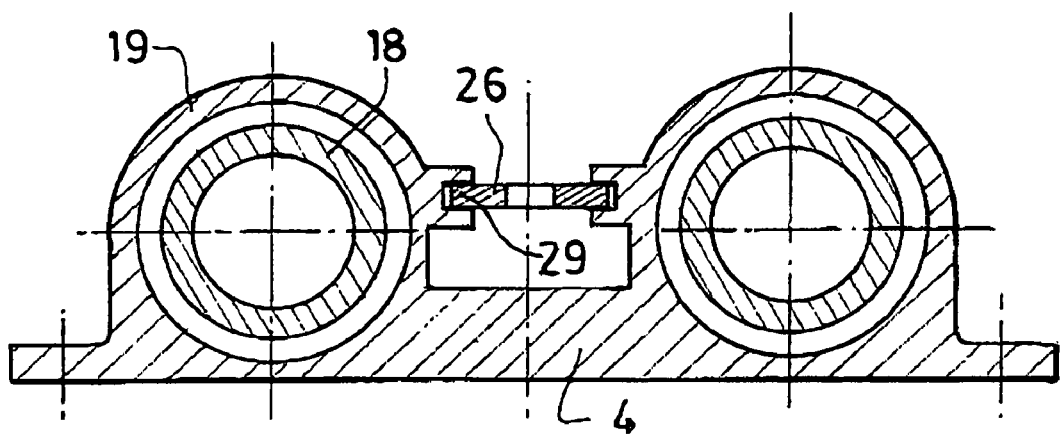
FIG. 7 is a section view taken along line VII-VII of FIG. 4.

FIGS. 2 and 3 show the roll-bars respectively in the retracted position and in the deployed position. FIG. 3 also shows the locking devices for locking the roll-bars in the deployed position, said devices not being shown in the other figures.

Each of said devices comprises a mechanism 8 having a ratchet 9 co-operating with teeth 10 formed at the free end of the branch 2 of the roll-bar. When the roll-bar reaches the deployed position, the ratchet 9 co-operates with the teeth 10 to prevent the roll-bar from returning to its retracted position. It should be noted that said locking device, which is situated on one side of and co-operating with the free end of the branch 2 of the roll-bar 2, imparts excellent rigidity to said roll-bar because, in the deployed position, said roll-bar is held at both of its ends.

Also in order to make the roll-bar as rigid as possible, the guide 6 is secured to the structure 11 of the vehicle 1. Said structure includes a transverse and substantially horizontal structural element 12 that is carried at either one of its ends by a structural tank member 13, 13'. The bottom portion of the beam 12 is situated at a certain height h from the floor 14 of the luggage compartment 15 of the vehicle.

The plate 4 can be connected to the guides 6, 6' via link elements 16, 16'. The plate 4 is itself mounted on the top portion of the beam 12. An assembly having excellent rigidity is thus obtained.

Figure 9:
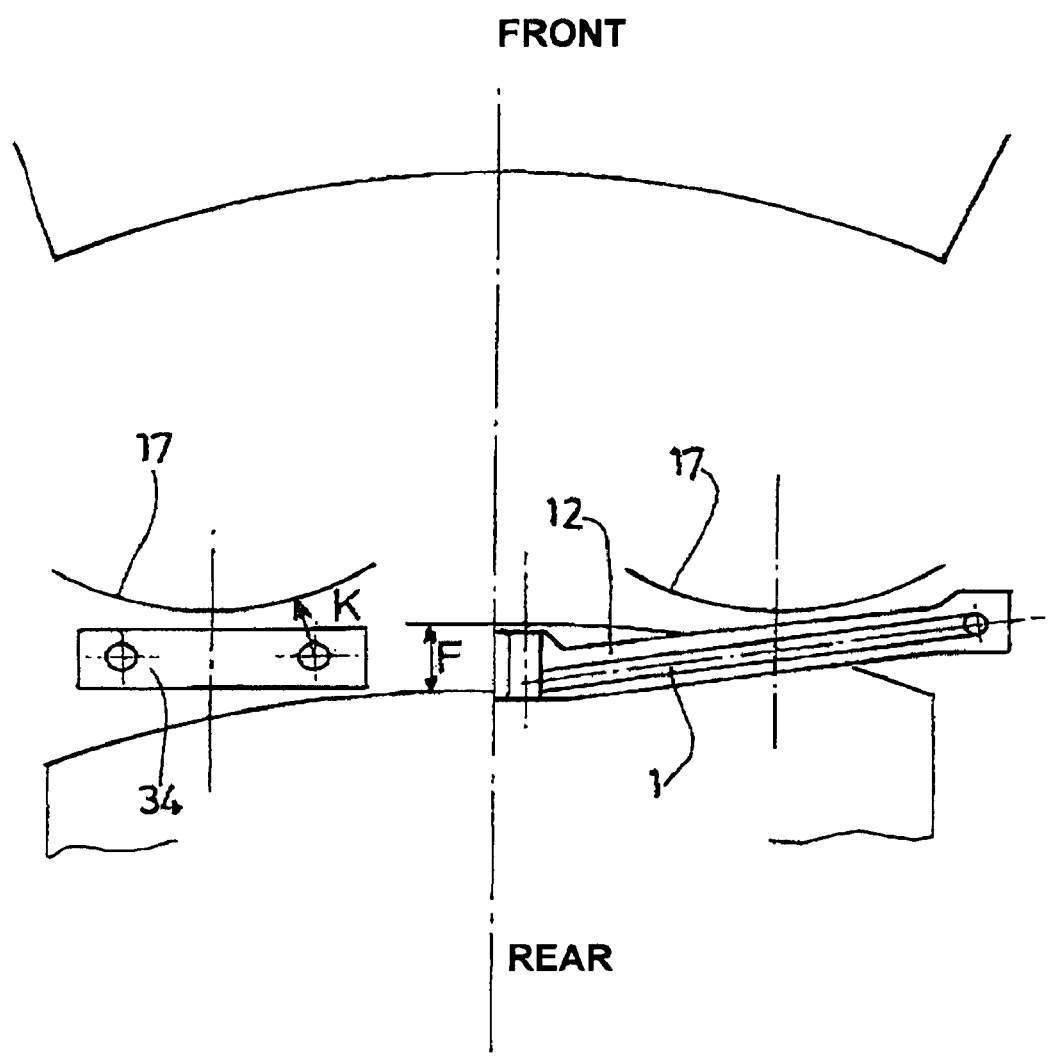
FIG. 9 shows the advantages of the invention compared with the prior art.

As can be seen in FIG. 9, the beam 12 is situated behind the backs 17 of the seats of the vehicle. In this example, the beam extends forwards and outwards on a slight slant so as to envelope the seat back better, and so as to vacate more space under the beam.

Reference is made below to FIGS. 4 to 7 which show the control members for controlling the roll-bars.

The free end of the branch 2 of the roll-bar 1 is fixed to a tube 18 engaged in a tubular portion 19 of the plate 4. A pre-stress spring 20 is disposed between the tube 18 and the tubular portion 19, one of its ends being fixed to the tube 18 and its other end being fixed to the tubular portion 19. The spring is pre-stressed when the roll-bar is in its retracted position.

The end of the tube 18 that extends beyond the tubular portion 19 is provided with a notch 21, inside which a locking finger 22 can engage to hold the roll-bar in the retracted position.

The locking finger 22 is part of a control part 23 engaged in a guide part 24 that is secured to the plate 4. A control cam 25 extends from the part 23 substantially perpendicularly to the plate 4.

The control cam 25 is organized to co-operate with a locking control fork 26 mounted at the free end of a U-shaped rod 27 of a control actuator 28. The locking fork 26 is guided by grooves 29 formed in the outside walls of the tubular portions 19.

Finally, a return spring 30 urges the locking parts 23, 23' back against the action of the locking fork 26.

When the roll-bars are to be deployed, the actuator 28 pushes the locking fork 26 so that the cams 25, 25' cause the parts 23, 23' to slide in the guide part 24. Therefore, the locking fingers 22, 22' disengage from the notch 21 and the springs 20, 20' cause the roll-bars to pivot and thus to be deployed.

The above-described control assembly offers the advantage of being very compact. Locking is achieved directly between the tube 18 and the bearing-forming tubular portion 19. In addition, the pre-stress spring 20 is disposed in the bearing.

In addition, the plate 4 supports both of the bearings so that it is possible to use a single, common actuator 28, offering the advantage of reducing the cost of the assembly. The plate 4 or support unit incorporates, inter alia, the functions of pre-stressing, locking, and triggering.

The device comprising the roll-bars and their fixing means offers good resistance to forces in case the vehicle rolls over. The forces are absorbed essentially in compression by the branches 2 and 3 of the roll-bars, said branches transmitting said forces to rigid structure portions of the vehicle via bearings and locking systems 8.

Figure 8:
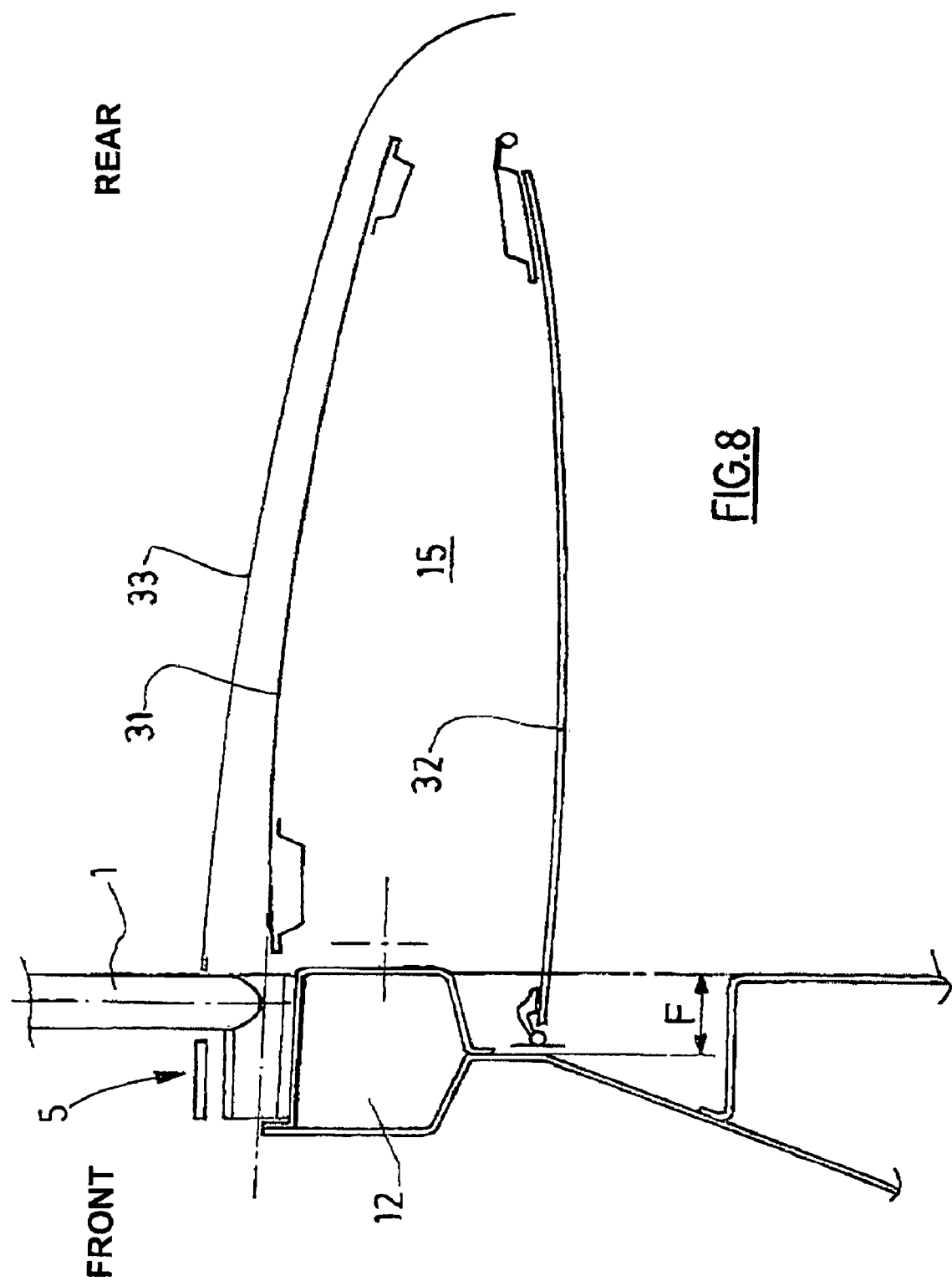
FIG. 8 is longitudinal section view of the rear of a vehicle equipped with the roll-bars of the preceding figures.

FIG. 8 shows the rear portion of a vehicle provided with roll-bars of the invention. This vehicle is of the convertible type, in which the roof elements 31 and 32 are stowed away in the luggage compartment 15 under the lid 33 of said compartment. It must be understood that it is essential to maximize the length available inside said compartment 15.

FIG. 9 shows that prior art roll-bar control devices require a guide control box 34 that must be disposed behind the back 18 of the seat and that must extend over a considerable height. In this invention, the beam 12 supports all of the guide and locking members 5 on its top portion. Therefore, immediately under the beam 12, and over a height h, extra length F is provided for the compartment 15.

It is thus possible to choose either to provide roof elements that are longer, thereby procuring a passenger compartment that is longer and therefore more comfortable in particular for the rear passengers, or else, with the roof length remaining constant, to reduce the length of the rear trunk and therefore to increase the length of the passenger compartment, or indeed to offer a trunk that is longer than the roof elements, thereby vacating stowage space, in particular at the rear of the trunk.

The invention claimed is:

1. A safety device used in case a vehicle rolls over, said safety device comprising:
    at least two curved bars, each curved bar having a first end and a second end, said bars being movable from a retracted position to a deployed position in case of a rollover;
    a pre-stressed system for deploying each bar;
    a trigger system that is activated in case the vehicle rolls over; and
    at least one locking member that maintains the pre-stress and that is released by means of the trigger system, thereby releasing each bar from its retracted position;
    said safety device being characterized in that the first end of each bar is hinged to a common central plate so that each of said two bars extends on a respective side of said plate, from a common face of said plate, and substantially symmetrically about a plane, a control, locking, and releasing device for controlling, locking, and releasing each bar being provided on the same face of said plate, said hinging of each bar being achieved by means of a bearing comprising a stationary part secured to the plate, and a moving part secured to the first end of the bar, the plate being designed to be fixed to a structural element of the vehicle.

2. A safety device according to claim 1, characterized in that the moving portion of the bearing is provided with a shape element which co-operates with the locking member of the locking system such as:

firstly to hold the bars in their retracted and pre-stressed position by means of the locking member engaging with the shape element; and secondly to release the curved bars by means of the locking member disengaging from the shape element.

3. A safety device according to claim 1, characterized in that the moving portion of the bearing comprises a shaft secured to the first end of the curved bar, said shaft being hinged about a pivot axis to the stationary portion of the bearing.

4. A safety device according to claim 3, characterized in that the shape element is a cavity in or a protrusion of the shaft, and the locking member is mounted to move on the stationary portion of the bearing.

5. A safety device according to claim 1, characterized in that the pre-stressed system is disposed inside the stationary portion of the bearing and in the immediate vicinity of the moving portion of the bearing.

6. A safety device according to claim 5, characterized in that the pre-stressed system is a spring disposed around the shaft, said spring having a first end connected to the moving portion of the bearing and a second end connected to the stationary portion of the bearing.

7. A safety device according to claim 6, characterized in that the spring is a torsion spring.

8. A safety device according to claim 1, characterized in that the axes of the bearings are substantially parallel.

9. A safety device according to claim 1, characterized in that it comprises at least two anti-reverse lock systems, each of which is disposed between the second end of each bar and a structural portion of the vehicle in order to prevent the bar from retracting when said bar is in the deployed position.

10. A device according to claim 9, characterized in that each anti-reverse lock system is a ratchet system.

11. A device according to claim 10, characterized in that each ratchet system is arranged to co-operate with teeth formed on the second end of the corresponding bar.

12. A motor vehicle including at least one row of seats secured to the floor, said vehicle being equipped with a safety assembly used in case it rolls over, said assembly comprising:

two curved bars, each of which has a first end and a second end, said bars being movable from a retracted position to a deployed position in case the vehicle rolls over, and the first ends of said bars being hinged to a support;

a pre-stressed system for deploying the bars; and a locking system that keeps the bars pre-stressed and that is released by means of a trigger system;

said motor vehicle being characterized in that it includes a vehicle structural element that is situated behind the seats, said structural element extending transversely and substantially horizontally, and being supported on either side at its ends on the chassis of said vehicle, said structural element having a bottom portion situated at a certain height above the floor of the vehicle, and a top portion to which said support is secured.

13. A vehicle according to claim 12, wherein the support is disposed in a transverse plane of the vehicle, said vehicle being characterized in that the portions of the bars that extend from said second ends are, in their retracted position, situated some distance forwards from the transverse plane of the vehicle in which the support is disposed.

14. A vehicle according to claim 12, characterized in that the structural element to which the support is secured is a beam.

15. A vehicle according to claim 13, characterized in that structural side portions of the vehicle are hollow tank members adapted internally to receive said portions of the bars in the retracted position and anti-reverse lock systems.

16. A vehicle according to claim 14, characterized in that the beam has two ends connected to two hollow tank members which are disposed on either side of the chassis or framework of the vehicle.

17. A vehicle according to claim 12, characterized in that two anti-reverse lock systems each a guide device for guiding the bars as they are being deployed.

18. A safety assembly designed to equip a vehicle according to claim 12, said safety assembly being characterized in that each of the curved bar portions extending from the second ends being inserted into a guide for guiding the bars as they are being deployed, the guide carrying an anti-reverse lock system; and the support being connected via the curved bars to the guides, whose anti-reverse lock systems are locked, the resulting assembly thus forming a pre-assembled module.

19. A safety assembly according to claim 18, characterized in that link elements connect a support unit to the guides.

20. A method for assembling a safety assembly according to claim 18 to a vehicle, said method including:

installing the pre-stressed systems, the locking system, and the trigger system on said support in order to form the support unit;

installing the first ends of the bars in the hinges of a support unit and placing the bars in their deployed position;

connecting the second ends of the bars to the guides by locking the anti-reverse lock systems (8);

disposing the pre-assembled module above said structural element of the vehicle and positioning the guides above the structural side portions.

lowering the pre-assembled module by inserting the guides into the structural side portions;

fixing the support unit to the structural element, and fixing the guides to the structural side portions;

releasing the locking system;

pivoting the bars from the deployed position to the retracted position, the two ends being guided by the guides; and locking the locking system.

21. A method of assembly according to claim 20, characterized in that, during pre-assembly of the safety module, the support unit and the guides are connected together via link elements.

22. A safety device used in case a vehicle rolls over, said safety device comprising:

at least two curved bars, each curved bar having a first end and a second end, said bars being movable from a retracted position to a deployed position in case of a rollover;

a pre-stressed system for deploying each bar;

a trigger system that is activated in case the vehicle rolls over; and at least one locking member that maintains the pre-stress and that is released by means of the trigger system, thereby releasing each bar from its retracted position;

said safety device being characterized in that the first end of each bar is hinged to a common central plate so that each of said two bars extends on a respective side of said plate, from a common face of said plate, and substantially symmetrically about a plane, a control, locking, and releasing device for controlling, locking, and releasing each bar being provided on the same face of said plate, said hinging of each bar being achieved by means of a bearing comprising a stationary part secured to the plate, and a moving part secured to the first end of the bar, the plate being designed to be fixed to a structural element of the vehicle;

wherein the moving portion of the bearing comprises a shaft secured to the first end of the curved bar, said shaft being hinged about a pivot axis to the stationary portion of the bearing.

23. A safety device used in case a vehicle rolls over, said safety device comprising:
  at least two curved bars, each curved bar having a first end and a second end, said bars being movable from a retracted position to a deployed position in case of a rollover;
  a pre-stressed system for deploying each bar;
  a trigger system that is activated in case the vehicle rolls over; and
  at least one locking member that maintains the pre-stress and that is released by means of the trigger system, thereby releasing each bar from its retracted position;
  said safety device being characterized in that the first end of each bar is hinged to a common central plate so that each of said two bars extends on a respective side of said plate, from a common face of said plate, and substantially symmetrically about a plane, a control, locking, and releasing device for controlling, locking, and releasing each bar being provided on the same face of said plate, said hinging of each bar being achieved by means of a bearing comprising a stationary part secured to the plate, and a moving part secured to the first end of the bar, the plate being designed to be fixed to a structural element of the vehicle; and
  wherein the pre-stressed system is disposed inside the stationary portion of the bearing and in the immediate vicinity of the moving portion of the bearing.

24. A motor vehicle including at least one row of seats secured to the floor, said vehicle being equipped with a safety assembly used in case it rolls over, said assembly comprising:
  two curved bars, each of which has a first end and a second end, said bars being movable from a retracted position to a deployed position in case the vehicle rolls over, and the first ends of said bars being hinged to a support;
  a pre-stressed system for deploying the bars; and
  a locking system that keeps the bars pre-stressed and that is released by means of a trigger system;
  said motor vehicle being characterized in that it includes a vehicle structural element that is situated behind the seats, said structural element extending transversely and substantially horizontally, and being supported on either side at its ends on the chassis of said vehicle, said structural element having a bottom portion situated at a certain height above the floor of the vehicle, and a top portion to which said support is secured; and
  wherein the support is disposed in a transverse plane of the vehicle, said vehicle being characterized in that the portions of the bars that extend from said second ends are, in their retracted position, situated some distance forwards from the transverse plane of the vehicle in which the support is disposed.

* * * * *